(12) United States Patent
Chen et al.

(10) Patent No.: US 7,018,004 B2
(45) Date of Patent: Mar. 28, 2006

(54) SYSTEM AND METHOD FOR BRAKE PRE-CHARGING

(75) Inventors: Ju Chen, Canton, MI (US); Gerald H. Engelman, Plymouth, MI (US); Levasseur Tellis, Southfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/707,501

(22) Filed: Dec. 18, 2003

(65) Prior Publication Data

US 2005/0133317 A1 Jun. 23, 2005

(51) Int. Cl.
*B60T 8/32* (2006.01)

(52) U.S. Cl. ............ 303/193; 188/1.11 R; 188/DIG. 1; 701/301; 340/441

(58) Field of Classification Search ............. 303/138, 303/122, 191, 193, 198, 59, 20; 188/1.11 R, 188/1.11 E, 190, DIG. 1; 701/96, 301; 180/170; 340/441, 467
See application file for complete search history.

(56) References Cited

U.S. PATENT DOCUMENTS

| | | | | |
|---|---|---|---|---|
| 4,050,746 | A | * | 9/1977 | Durling ........................ 303/40 |
| 4,969,103 | A | * | 11/1990 | Maekawa ..................... 701/96 |
| 6,270,171 | B1 | | 8/2001 | Krieg et al. |
| 6,292,753 | B1 | | 9/2001 | Sugimoto et al. |
| 6,411,204 | B1 | * | 6/2002 | Bloomfield et al. ......... 340/467 |
| 6,474,753 | B1 | * | 11/2002 | Rieth et al. .................. 303/191 |
| 6,488,109 | B1 | * | 12/2002 | Igaki et al. .................. 180/169 |
| 6,517,172 | B1 | | 2/2003 | Bond, III et al. |
| 6,523,912 | B1 | | 2/2003 | Bond, III et al. |
| 6,543,567 | B1 | * | 4/2003 | DeLuca et al. ............. 180/275 |
| 6,677,855 | B1 | * | 1/2004 | Engelman et al. .......... 340/439 |
| 2003/0038715 | A1 | | 2/2003 | Engelman et al. |

* cited by examiner

*Primary Examiner*—Melody M. Burch
(74) *Attorney, Agent, or Firm*—Frank A. MacKenzie

(57) ABSTRACT

A system and method for brake pre-charging includes pre-filling brakes, based on proximity information from a forward-looking sensor, to reduce the initial delays associated with braking. By reducing the initial delay in converting driver brake pressure requests into actual brake torque to the wheels, the stopping distance required for braking is reduced.

30 Claims, 2 Drawing Sheets

SYSTEM AND METHOD FOR BRAKE PRE-CHARGING

BACKGROUND OF INVENTION

The present invention relates to vehicle braking, and, in particular, to a system and method for brake pre-charging.

Vehicles currently include brake systems that inhibit rotation of vehicle wheels to decelerate and stop the vehicles.

Heretofore, vehicle braking systems have been activated by the driver depressing a brake pedal. The onset of a driver's intent to begin decelerating a vehicle, however, often occurs prior to the driver actually depressing the brake pedal. The elapsed time between these two events results in delayed warning of intent to following drivers via the warning lights and delayed braking of the vehicle (initiation delays), and delayed stopping of the vehicle.

An additional form of delay (engagement delays) exists in the actual energizing of the brake system from a totally dormant state to the fully active state.

While these types of delays only last a fraction of a second, reducing these delays on this order of magnitude can mean significant improvement in stopping distance for the braking vehicle, with the actual magnitude dependent on the vehicles" initial rate of travel. Stopping distance improvement can reduce the kinetic energy of a collision thereby potentially improving safety of all involved and potentially reducing property damage.

Ideal vehicle stop models measure applied pedal force and vehicle deceleration against time. A key component in the model is the initial delay, defined as the time delay associated with generating brake torque (and hence vehicle deceleration) as a consequence of applied pedal force. The initial delay can be attributed, in part, to the large quantity of brake fluid that must be delivered to the calipers, wheel cylinders and chambers through relatively narrow brake lines during brake requests.

Initial delays in braking systems can be quite costly due to lost stopping distance. For example, for a typical automobile traveling at 60 MPH, a braking system with an initial delay of 100 milliseconds can add approximately nine feet to the required stopping distance.

The limitations associated with current braking techniques have made it apparent that a new technique to minimize braking delay time is needed. The new technique should predict a target object's position and direction of travel with respect to a host vehicle and should also provide a deployment decision tailored to the nature and time requirement of a countermeasure. The present invention is directed to these ends.

SUMMARY OF INVENTION

The present invention provides a system and method for brake pre-charging. In accordance with one aspect of the present invention, a braking system for a vehicle includes a wheel coupled to the vehicle, and a brake coupled to the wheel. The brake includes a friction component for inhibiting rotation of the wheel. The brake has a first state, wherein the friction component is positioned a first distance from the wheel and a second state, wherein the friction component is positioned a second distance from the wheel closer than the first distance. A proximity sensor is coupled to the vehicle and sensing an object along a direction of travel of the vehicle. The proximity sensor generates a proximity signal therefrom. A controller receives the proximity signal and generates therefrom a threat of collision prediction signal. The also controller generates signals to move the friction component from the first state to the second state in response to a high threat of collision determined from the threat of collision prediction signal.

In accordance with another aspect of the present invention, a method for pre-charging brakes for a vehicle includes sensing an object in a near vicinity of the vehicle, generating a proximity signal, predicting a threat of collision between the object and the vehicle in response to the proximity signal, determining whether the threat of collision is high, and pre-charging the brakes in response to a high threat of collision prediction.

The present invention offers an advantage over existing art based on its use of proximity information (i.e. range to target, range rate to target, etc) when assessing pre-charge conditions, rather than relying on an operational parameter of the vehicle that is based on the subjective nature of the driver's activity/inactivity.

Other advantages and features of the present invention will become apparent when viewed in light of the detailed description of the preferred embodiment when taken in conjunction with the attached drawings and appended claims.

BRIEF DESCRIPTION OF DRAWINGS

FIG. 1 is a vehicle braking system in accordance with one embodiment of the present invention.

DETAILED DESCRIPTION

The present invention is illustrated with respect to a vehicle braking system, particularly suited to the automotive field. The present invention is, however, applicable to various other uses that may require braking systems, as will be understood by one skilled in the art.

The specific devices and processes illustrated in the attached drawings, and described in the following specification are exemplary embodiments of the inventive concepts defined in the appended claims. Hence, specific dimensions and other physical characteristics relating to the embodiments disclosed herein are not to be considered as limiting, unless the claims expressly state otherwise.

In accordance with one embodiment of the present invention, reducing initial braking delay includes reducing the distance between the brake friction material and surfaces just prior to driver brake actuation. This pre-charging method increases hydraulic pressure on the wheels based on the occurrence of a control signal or pre-charge condition. Pre-charging includes having the brake linings adjoin the brake disk or brake drum while no appreciable deceleration of the vehicle occurs. The following system and method are directed to these ends.

Figure 1C:
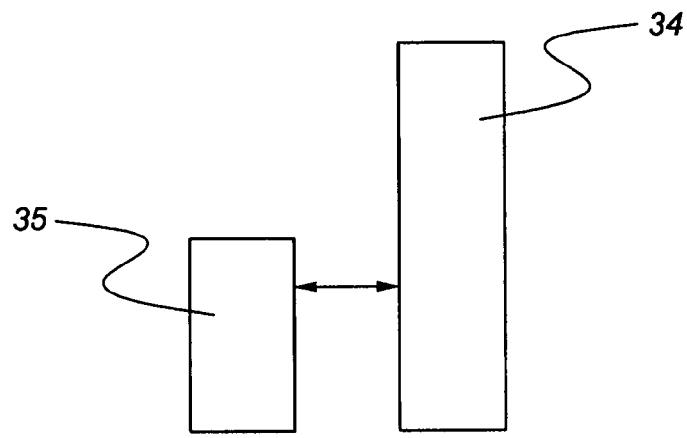
FIG. 1C illustrates the friction component of braking system of FIG. 1 in a third state.
Figure 1B:
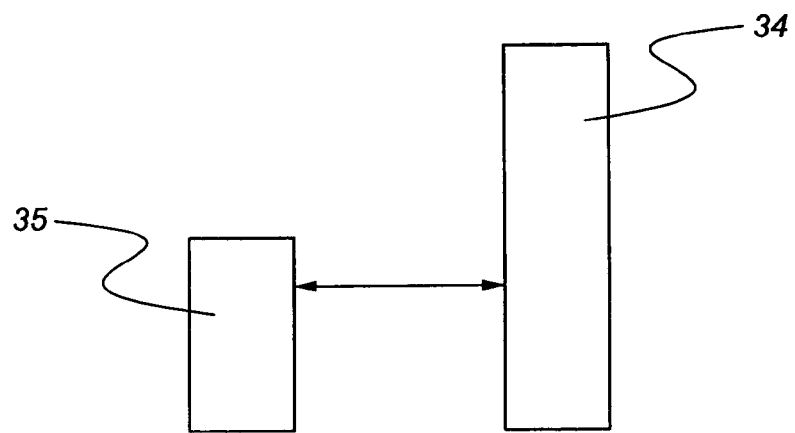
FIG. 1B illustrates the friction component of braking system of FIG. 1 in a second state.
Figure 1A:
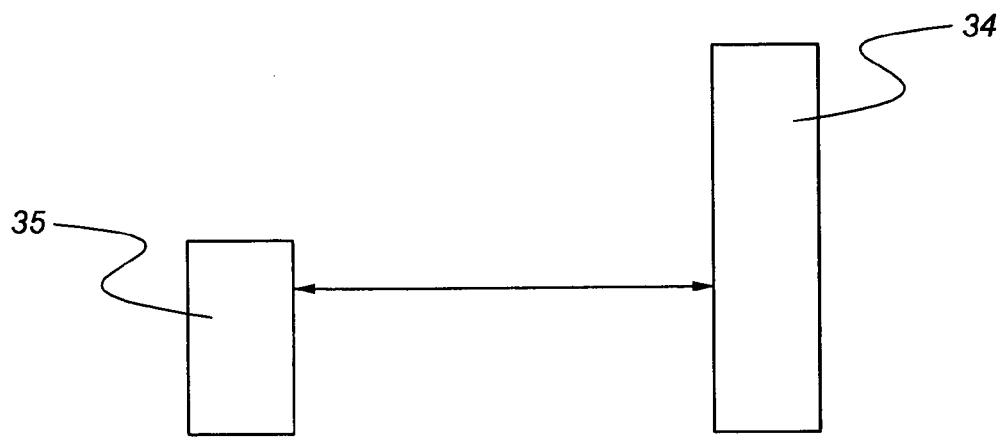
FIG. 1A illustrates the friction component of braking system of FIG. 1 in a first state.
Figure 2:
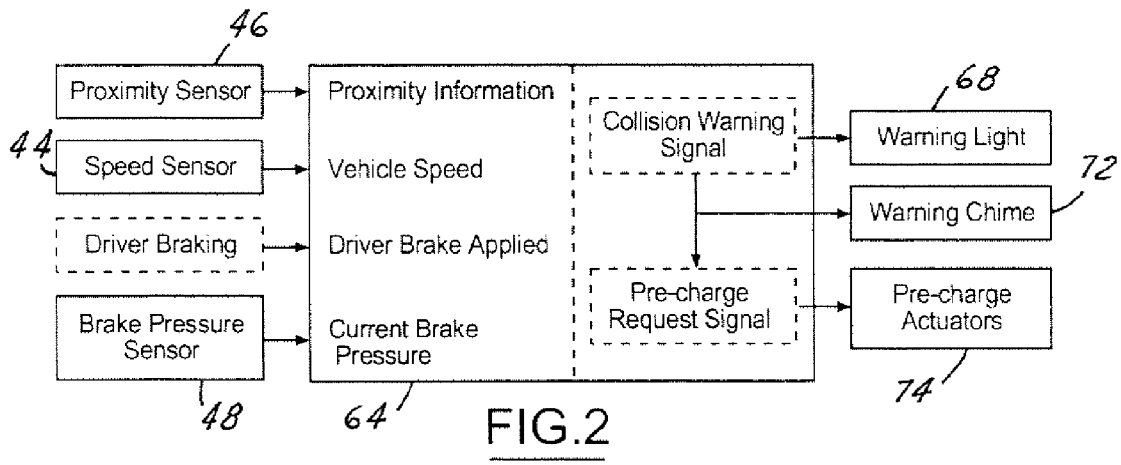
FIG. 2 is a controller for the vehicle braking system of FIG. 1.

Referring to FIGS. 1 and 2, a vehicle braking system 10, in accordance with one embodiment of the present invention, is illustrated. The vehicle braking system 10 includes a vehicle 11 having wheels 12 with brakes 14 coupled thereto. The vehicle braking system 10 further includes a brake pedal 28, calipers 36, a brake fluid line 40, a friction component (brake pad 35) and various other brake components, a vehicle speed sensor 44, a proximity sensor 46, a brake pressure sensor 48, a pre-charge actuator (master cylinder 76), a master controller 64, a heads up display warning light 68, a warning chime 72, and brake lights 52.

The sensors, vehicle speed sensor 44, proximity sensor 46, and brake pressure sensor 48, are coupled to the controller 64 and are one example of a possible sensor combination. The brake pedal 28 and the various brake components are coupled together to form a common brake system responsive to the controller 64, as will be understood by one skilled in the art. The heads up display warning light 68, warning chime 72, and brake lights 52 are also coupled to the controller 64 and are responsive to pre-charging and braking signals generated therefrom.

The vehicle speed sensor 44 senses an operational parameter of the vehicle braking system 10. The vehicle speed sensor 44 is one example of an operational parameter sensor, and alternate sensors, including yaw, pitch, roll sensors, may also be used. The vehicle speed sensor 44 generates an operational parameter signal, more specifically, a vehicle speed signal corresponding to vehicle speed. Additionally, The operational parameter in the present invention is any parameter that can be measured that would indicate an intention by the driver of the vehicle to brake the vehicle or that indicates that braking is imminent.

The proximity sensor 46 is a forward looking sensor generating proximity signals used by the controller 64 to generate a threat of collision signal. The proximity sensor 46 may include radar, lidar, or vision based sensors or any combination thereof. These sensors may sense range to target object, range rate to target object, and other relational parameters.

The brake pressure sensor 48 generates a current brake pressure signal in response to current brake pressure in, for example, the brake line 40.

The controller 64 or radar-assisted collision mitigation pre-charge system controller (CMPCS) uses proximity information from a forward-looking sensor (proximity sensor 46) in order to calculate the threat of collision (TOC). This TOC calculation is used to determine when to deliver a pre-charge amount to the brakes 14.

The controller 64 (master controller 64) may include a general purpose microprocessor-based controller and may also include a commercially available off-the-shelf controller. The controller 64 preferably includes a processor and memory for storing and processing software algorithms, which process sensed vehicle information, including the vehicle speed signal, the proximity signal, the brake pressure signal, and driver braking signals (i.e. the driver depresses the brake pedal).

The controller 64 responds to the received signals by determining if the vehicle 11 is approaching another vehicle or object faster than a certain predetermined rate. If an operational parameter of the controller 64 occurred faster than the predetermined rate programmed into the controller 64 (i.e. the threat of collision is high), the controller 64 signals the friction component (brake pad 35) within the brakes 14 to move from the first position to the second position. The controller 64 accomplishes this by generating a pre-charge request signal that activates the functions of the master cylinder 75. Preferably, the aforementioned predetermined rate is one that indicates that the driver of the vehicle 11 is or should be about to apply the brakes, such as during a collision situation.

Alternatively, the predetermined measurement may be a measurement of the distance from the object to the vehicle 11 or the rate of change of the distance of the object in front of the vehicle 11. If the vehicle in front of the vehicle braking system 10 is too close or if the vehicle in front of the vehicle braking system 10 is relatively approaching the vehicle braking system 10 (i.e., moving closer to the vehicle braking system 10 because the vehicle in front of the vehicle 11 is stopped, is stopping faster than the vehicle 11, or is moving toward the vehicle 11), the brakes 14 move to the second position.

In one embodiment of the present invention, the brakes 14 further include a third state, wherein the friction component 35 is positioned a third distance from the wheel 12. The controller 64 moves the friction component 35 from the first state (illustrated in FIG. 1A) or the second state (illustrated in FIG. 1B) to the third state (illustrated in FIG. 1C) as a function of the high threat of collision determined from the threat of collision prediction signal and a signal indicating that a throttle pedal has been released. This movement to this third state is a second-stage pre-charging operation.

The controller 64 will inhibit the friction component 35 moving from the first state or the second state to the third state only if a failure with throttle actuation cannot be determined.

Movement of the friction component 35 is halted through throttle pedal activation or in response to the vehicle near a limit of handling point regardless of an estimated threat, and movement of the friction component 35 is inhibited in response to failure of the vehicle braking system 10, the vehicle speed sensor 44 or the proximity sensor 46.

In another embodiment, after the brake pad 35 has been moved to the second position in response to the controller pre-charge request signal activating the pre-charge actuator 74, the brake pad 35 moves from the second position back to the first position if the brake pedal 28 is depressed or if threat of collision is minimized (this is controlled by the master controller 64 in the present embodiment). Therefore, the brake pad does not remain in the second position if the driver does not have an intention of braking the vehicle braking system 10.

The design thresholds for the operational parameter and the predetermined measurement, including the degree and rate of release of the throttle, and the time that the friction component (brake pad 35) remains in the second position without depression of the brake pedal 28 or without substantial crash threat, can be established or even customized based on the vehicle manufacturer's desired brand identity. This identity may include the estimate and/or prediction of their customer's driving characteristics and desired reduction in delays before braking, the propensity for and degree of false activation, and compliance with applicable regulatory requirements.

In response to a threat of collision signal from the controller 64, a heads up display warning light 68, a warning chime 72, brake lights 52 activate. These devices signal both the driver of the vehicle 11 and drivers in other vehicles of the imminent braking condition that has occurred and that braking is commencing.

The braking system 10 includes brakes 14 for inhibiting rotation of the wheels 12. The braking system 10 further includes a brake pedal 28 depressing to move the brakes 14 into engagement with a portion of the wheels 12.

The braking system 10 has a dormant state wherein normal vehicle braking operations occur. During this dormant state, the brake pads 35 are at a first position spaced a first distance from the wheels 12.

The brake pads 35 move from the first position to a second position spaced a second distance from the wheels 12 in response to a predetermined measurement of the operational parameter, a high threat of condition, and before depression of the brake pedal 28, wherein the second position is closer to the wheels 12 than the first position.

The brake pad 35 (friction component) can be either a brake pad 35 in a disc brake system 14, a brake pad on a brake shoe in a drum brake system, or an alternate braking component designed to slow wheel spinning. Each wheel 12 of the illustrated vehicle braking system 10 is associated with one brake 14. The braking system 10 also includes, for example, a hub 32, a rotor 34, a caliper 36, a piston 38 and a brake fluid line 40.

With the controller 64, the brakes 14 are closer to or slightly engaged with the wheel 12 such that rotation of the wheel 12 is not inhibited. However, the brakes 14 engage the portion of the wheel 12 to slow rotation of the wheel 12 faster when the brakes 14 move from the second position than when the friction component (brake pad 35) moves from the first position. Consequently, the controller 64 reduces the time period needed to adequately slow or stop the vehicle braking system 10.

The wheel 12 of the vehicle braking system 10 includes the hub 32, a tire and the rotor 34. Therefore, the hub 32 and the rotor 34 rotate with the tire. The caliper 36 straddles the rotor 34 and a bore 42 in the caliper 32 faces the rotor 34. The piston 38 is located in the bore 42 and also faces the rotor 34.

The brake fluid line 40 is coupled to the bore 42 at a position behind the piston 38 and supplies a fluid to the bore 42 to force the piston 38 out of the bore 42 towards the rotor 34. The brake pad 35 is attached to an end of the piston 38 facing the rotor 34 and therefore is configured for engagement with the rotor 34. The brakes 14 are embodied as a floating-caliper disc brake system. Therefore, a static brake pad 35 is connected to an arm 46 of the caliper 36 opposite the piston 38. When the brake pad 35 on the piston 38 abuts the rotor 38, the caliper 36 is forced over such that the static brake pad 35 abuts a face of the rotor 36 opposite the brake pad 35.

In one embodiment of the present invention, a fluid injection system is used to supply fluid to the brakes 14 as described above to move the brakes 14 from the first position to the second position in response to the controller pre-charge request signal.

The small amount of brake fluid that enters the brake line 40 thereafter enters the bore 42 of the brakes 14 to push the piston 38 and the brakes 14 from the first position to the second position. The controller 64 directs a motor to actuate the piston 38 in response to the predetermined measurement of the operational parameter or the threat of collision. If the brake pedal 28 has not been depressed a certain time after the predetermined measurement of the operational parameter, the piston 38 moves backward to allow the small amount of fluid to reenter a master cylinder reservoir to allow the brakes 14 to move from the second position to the first position.

Figure 3:
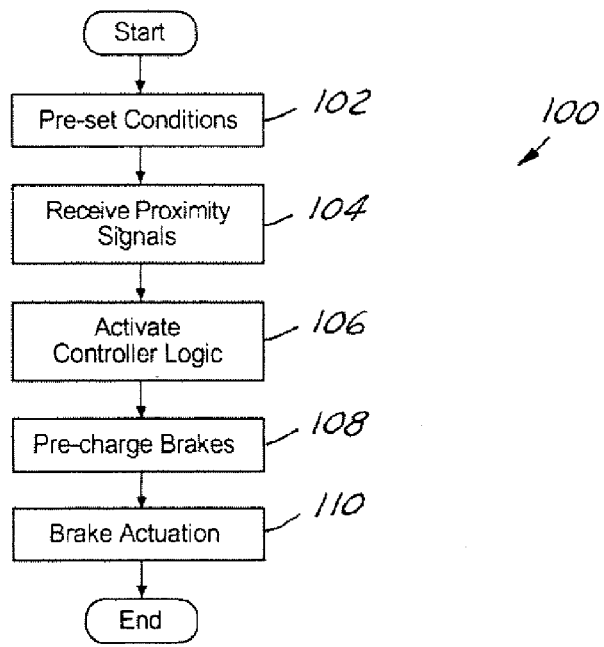
FIG. 3 is a logic flow diagram of a method for brake pre-charging in accordance with another embodiment of the present invention.

Referring to FIG. 3, a logic flow diagram of a method 100 for pre-charging a braking system is illustrated. Logic starts in operation block 102 where pre-set conditions are set up. This includes situating the brake pads 35 at the first position spaced the first distance from the rotor 34 before controller pre-charging is initiated and when the brake pedal 28 is not depressed.

In operation block 104, the controller 64 receives proximity signals. In operation block 106, controller logic activates responsive to the proximity signal.

In operation block 108, once the controller 64 is activated, a small amount of fluid is forced from the brake fluid line 40 and into the bore 42 in order to move the brake pad 35 closer to the rotor 34. The brakes 14 are therefore in the second position at the which is closer to the rotor 34 than the first position. The second position may place the brake pad 35 in engagement with the rotor 34, but the brake pad 35 in the second position does not significantly inhibit rotation of the wheel 12. Consequently, the vehicle braking system 10 does not significantly slow or decelerate when the brake pad 35 is in the second position.

In operation block 110, once the driver braking signals are received, more fluid is forced behind the piston 38 to force the brake pad 35 into significant engagement with the rotor 34 such that the vehicle 11 begins to decelerate.

The controller 64 reduces the time required to move the brakes 14 into engagement with the wheel 12 when the brake pedal 28 is depressed because the brakes 14 only travels the second distance 26, and not the first distance, before the brakes 14 significantly engages the wheel 12.

In operation, the controller 64 monitors proximity information in addition to information such as vehicle speed, driver intent and current brake pressure. The controller 64 does not request pre-charging until information from the proximity sensor indicates a possible accident will occur, as analyzed by the controller 64. The system 10 suspends the pre-charge request when the driver applies the brakes or the threat of collision is minimized.

The above-described apparatus and method, to one skilled in the art, is capable of being adapted for various purposes and is not limited to automotive systems. The above-described invention may also be varied without deviating from the spirit and scope of the invention as contemplated by the following claims.

What is claimed is:

1. A vehicle braking system having a wheel coupled to a vehicle, a brake coupled to the wheel, wherein the wheel includes a friction component for inhibiting rotation at the wheel, the brake having a first state wherein said friction component is positioned a first distance from said wheel, and a second state, wherein said friction component is positioned a second distance from said wheel closer than said first distance, the vehicle braking system comprising:

a proximity sensor coupled to the vehicle and sensing an object along a direction of travel of the vehicle end generating a proximity signal therefrom; and a controller receiving said proximity signal and generating therefrom a threat of collision prediction signal, said controller moving the friction component from the first state to the second state as a function of a high threat of collision determined from the threat of collision prediction signal, wherein said movement of the friction component is halted through throttle pedal activation.

2. The system of claim 1 further comprising a vehicle speed sensor coupled to the vehicle and sensing a speed of the vehicle and generating a vehicle speed signal therefrom.

3. The system of claim 1 further comprising a brake pressure sensor coupled to the vehicle and sensing a current brake pressure and generating a current brake pressure signal therefrom.

4. The system of claim 3, wherein said controller receives said proximity signal, a vehicle speed signal, and said current brake pressure signal, and wherein said controller generates therefrom said threat of collision prediction signal.

5. The system of claim 4, wherein said threat of collision prediction signal is a function of a closing velocity between the vehicle and said object above a threshold.

6. The system of claim 4 further comprising a brake pedal coupled to the vehicle, wherein the friction component moves from the second position to the first position when the brake pedal has not been depressed a predetermined time after said threat of collision signal is generated.

7. The system of claim 1, wherein said proximity sensor comprises a radar, lidar or vision based sensor.

8. The system of claim 1 further comprising a warning signal coupled to the vehicle and activating in response to said threat of collision signal.

9. The system of claim 8, wherein said warning signal comprises a warning light, a warning chime, or a brake light.

10. The system of claim 1, wherein the brake further comprises a third state, wherein said friction component is positioned a third distance from said wheel, said controller moving the friction component from the first state or the second state to said third state as a function of said high threat of collision determined from the throat of collision prediction signal and a signal indicating that a throttle pedal has been released, wherein movement of the friction component to said third state is a pre-charging operation.

11. The system of claim 10, wherein said controller will inhibit the friction component moving from the first state or the second state to said third state only if a failure with throttle actuation cannot be determined.

12. The system of claim 1, wherein movement of the friction component is halted in response to the vehicle near a limit of handling point regardless of an estimated threat.

13. The system of claim 1, wherein movement of the friction component is inhibited in response to failure of the vehicle braking system, a vehicle speed sensor or said proximity sensor.

14. A vehicle braking system having a wheel having a rotor coupled to a vehicle, a brake coupled to the wheel, wherein the wheel includes a friction component for inhibiting rotation of the wheel, the brake having a first state wherein said friction component is positioned a first distance from the wheel rotor, and a second state, wherein the friction component is positioned a second distance from the wheel rotor closer than the first distance, the brake further including a third state, wherein the friction component is positioned a third distance from the wheel rotor, the vehicle braking system comprising:
 a proximity sensor coupled to the vehicle and sensing an object along a direction of travel of the vehicle and generating a proximity signal therefrom;
 a vehicle speed sensor coupled to the vehicle and sensing a speed of the vehicle and generating a vehicle speed signal therefrom:
 a brake pressure sensor coupled to the vehicle and sensing a current brake pressure and generating a current brake pressure signal therefrom; and
 a controller receiving said proximity signal, said vehicle speed signal, and said current brake pressure signal, said controller generating therefrom a threat of collision prediction signal as a function of an analysis of a closing velocity between the vehicle and said object above a threshold and within a close proximity of the vehicle, said controller moving the friction component from the first state to the second state in a first pre-charging operation in response to a high threat of collision within said threat of collision prediction signal, wherein said controller moving the friction component from the first state or the second state to the third state as a function of said high threat of collision determined from the threat of collision prediction signal and a signal indicating that a throttle pedal has been released, wherein moving the friction component from the second state to the third state is a second pre-charging operation.

15. The system of claim 14, wherein said controller will inhibit the friction component moving from the first state or the second state to said third state only if a failure with throttle actuation cannot be determined.

16. The system of claim 14, wherein movement of the friction component is halted through throttle pedal activation.

17. The system of claim 14, wherein movement of the friction component is halted in response to the vehicle near a limit of handling point regardless of an estimated threat.

18. The system of claim 14, wherein movement of the friction component is inhibited in response to failure of the vehicle braking system, a vehicle speed sensor or a proximity senor.

19. The braking system of claim 14 further comprising a brake pedal coupled to the vehicle, wherein said friction component moves from said second position to said first position when said brake pedal has not been depressed a predetermined time after said threat of collision prediction signal is generated.

20. The system of claim 14 further comprising a warning signal coupled to the vehicle and activating in response to said threat of collision signal, wherein said warning signal comprises a warning light, a warning chime, or a brake light.

21. A method for pre-charging brakes for a vehicle, said method comprising:
 sensing an object in a near vicinity of the vehicle;
 generating a proximity signal;
 predicting a threat of collision between said object and the vehicle in response to said proximity signal;
 determining whether said threat of collision is high;
 engaging a first stage pre-charge wherein a friction component is positioned a first distance from a wheel rotor in response to a high threat of collision prediction; and
 engaging a second stage pre-charge wherein the friction component is positioned a second distance from the wheel rotor closer than the first distance and short of engaging the brakes as a function of a high threat of collision and a signal indicating that a throttle pedal has been released.

22. The method of claim 21 further comprising moving said friction component from said second distance to said first distance if a brake pedal is not depressed a predetermined time after said threat of collision.

23. The method of claim 21, wherein predicting said threat of collision further comprises sensing an operational parameter of the vehicle.

24. The method of claim 21, wherein predicting said threat of collision further comprises sensing a current brake pressure.

25. The method of claim 21 further comprising notivating a vehicle warning device in response to said threat of collision.

26. The method of claim 21, wherein pre-charging further comprises calculating an amount of pre-charging required to avoid a collision.

27. The method of claim 21 further comprising inhibiting said second stage pre-charge only if a failure with throttle actuation cannot be determined.

28. The method of claim 21 further comprising halting said second stage pre-charge through throttle pedal activation.

29. The method of claim 21 further comprising halting said second stage pre-charge in response to the vehicle near a limit of handling point regardless of an estimated threat.

30. The method of claim 21 further comprising inhibiting said second stage pre-charge in response to failure of the vehicle braking system, a vehicle speed sensor or a proximity sensor.

* * * * *